Sept. 19, 1961 S. DOMESHEK 3,000,257
AMBIENT ILLUMINATION OF RETICLE FOR RANGEFINDER
Filed June 11, 1959 3 Sheets-Sheet 1
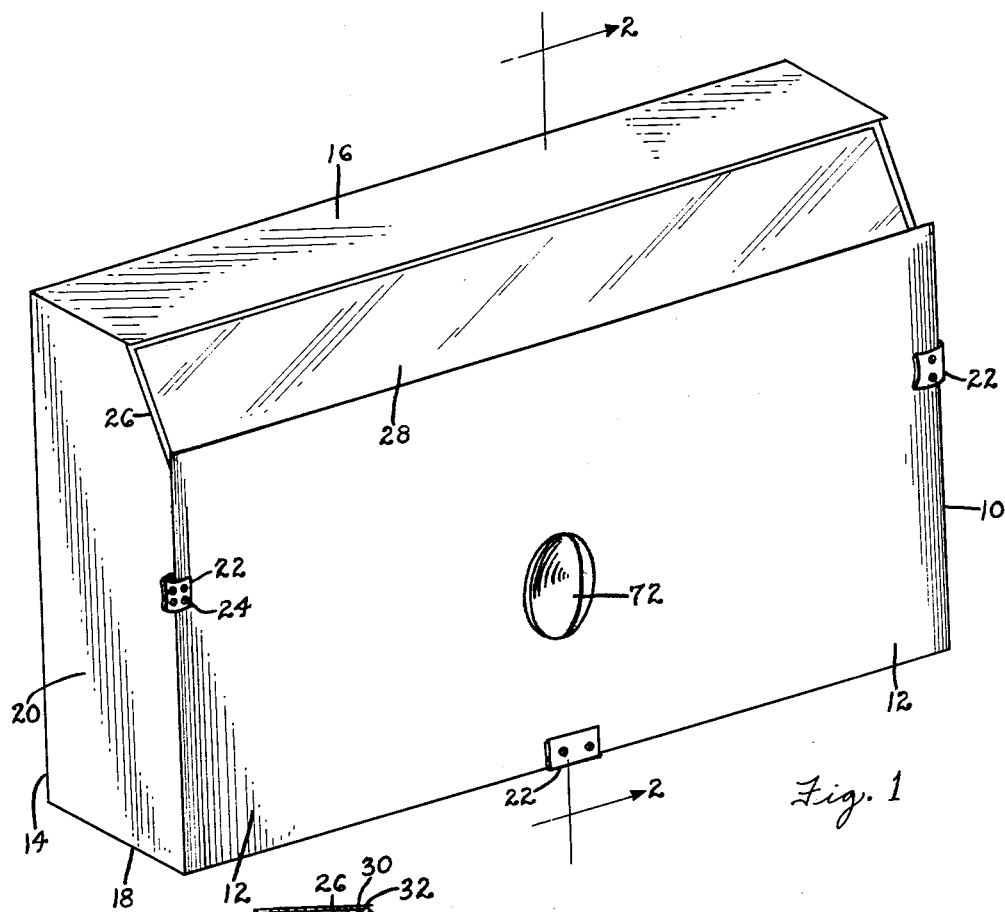
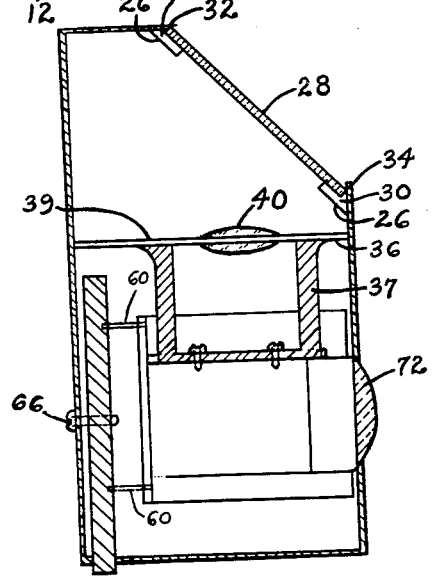
INVENTOR.
SOL DOMESHEK
BY
Lawrence S. Epstein
ATTORNEYS Sept. 19, 1961     S. DOMESHEK     3,000,257
AMBIENT ILLUMINATION OF RETICLE FOR RANGEFINDER
Filed June 11, 1959     3 Sheets-Sheet 2
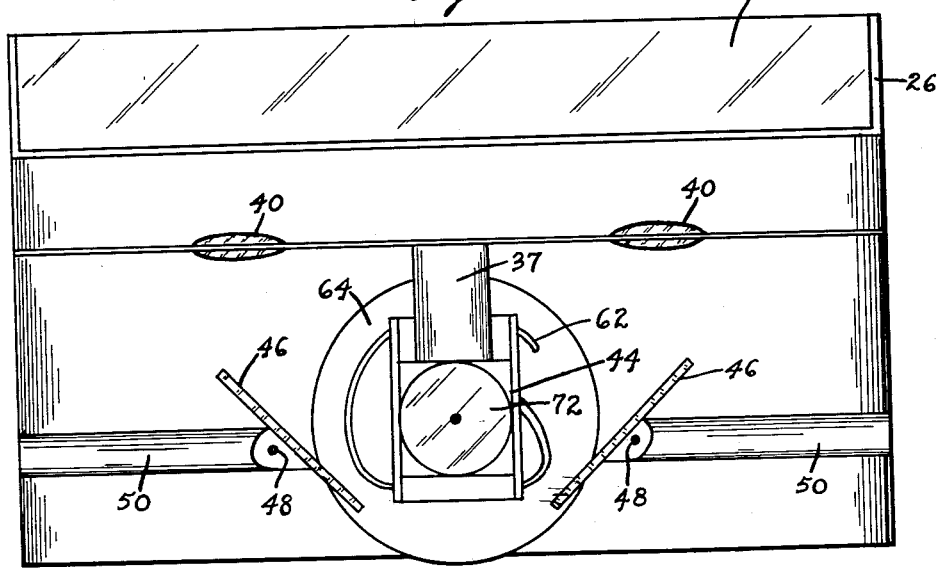
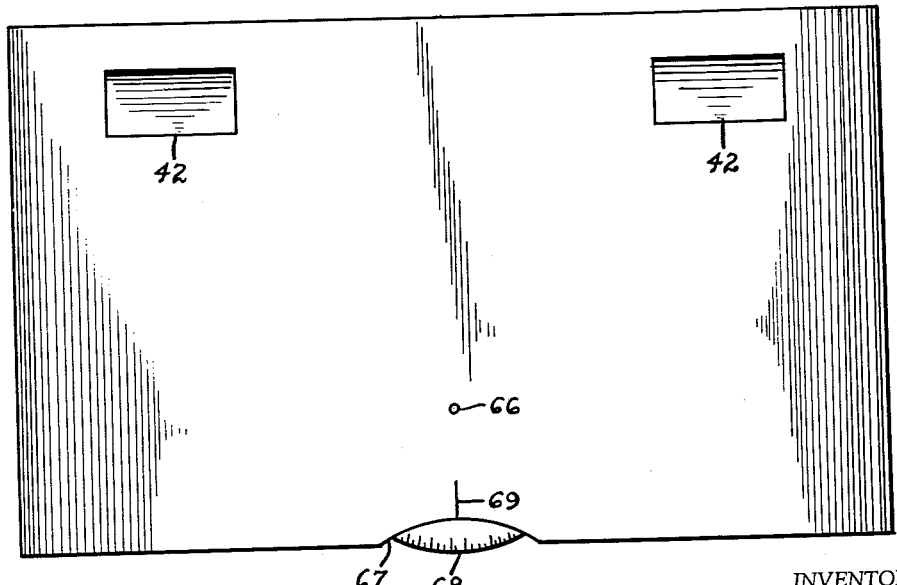
INVENTOR.
SOL DOMESHEK
BY
Lawrence S. Epstein
ATTORNEYS

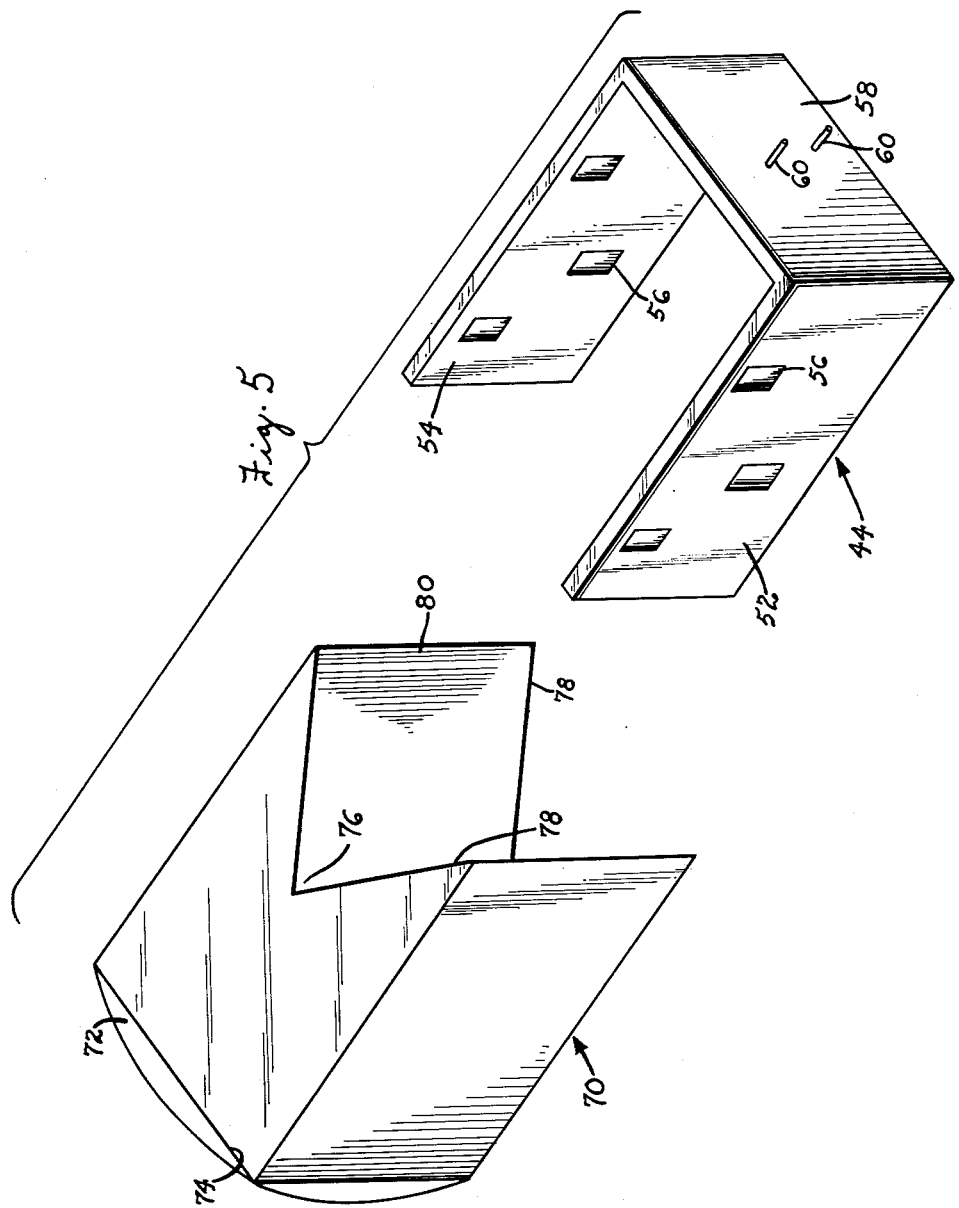

3,000,257
Patented Sept. 19, 1961

---

3,000,257
AMBIENT ILLUMINATION OF RETICLE FOR RANGE FINDER
Sol Domeshek, 160 S. Middleneck Road, Great Neck, N.Y.
Filed June 11, 1959, Ser. No. 819,786
2 Claims. (Cl. 88—2.6)
(Granted under Title 35, U.S. Code (1952), sec. 266)

The invention described herein may be manufactured and used by or for the Government of the United States of America for governmental purposes without the payment of any royalties thereon or therefor.

This invention relates to a pocket size ranging device capable of directly measuring the distance between an object and the observer, and pertains particularly to the illumination of a ranging reticle which may be adjusted to be in the same plane as the object being viewed and normal to the visual axis. By employing suitably calibrated means, the distance is then read directly.

It is desirable to provide a simple, yet effective means for observing an object at a distance, and for accurately determining that distance from the observer. Design complexity and cost has always been a major problem in ranging devices. The device of the invention avoids these difficulties by employing a simple assembly of reflecting and refracting elements and a reticle, whereby visual ranging as well as training in visual ranging is carried out in a simple, yet efficient manner. The instant invention avoids the use of artificial illumination and power therefor, and makes use of the ambient illumination for the reticle instead. Since the movable parts and optical elements have been reduced to a minimum, the problem of size and maintenance has also been minimized.

A primary object of the invention is to provide an improved pocket-size device that is capable of visually measuring distance between an object and the observer.

Another important object is to provide an improved stereoscopic viewing and ranging device that contains a minimum of parts.

A further important object is to provide a structure which is designed to collect ambient illumination and direct it so that two stereo reticles may be illuminated for use in a stereoscopic instrument.

Still another object of the invention is to eliminate the use of auxiliary power for lighting and thereby reduce the parts used to a minimum.

Other objects and many of the attendant advantages of this invention will be readily appreciated as the same becomes better understood by reference to the following detailed description when considered in connection with the accompanying drawings wherein:

FIGURE 1 is a perspective front view of the invention and shows the collecting lens for illuminating the reticle, FIGURE 2 is a section taken along line 2—2 of FIGURE 1, FIGURE 3 is a view in elevation of the invention with the front cover removed, FIGURE 4 is a rear elevation of the ranging device, and FIGURE 5 is a perspective view of the reticle and the illuminating lens and block of the invention.

Referring to FIGURE 1, housing 10 may be in rectangular form and is constructed of any suitable material such as wood, metal or plastic. Housing 10 comprises a removable front panel 12, a rear panel 14, top and bottom panels or plates 16 and 18 respectively, and side panels 20.

Side panels 20, top and bottom panels 16 and 18 and back panel 14 may be separate pieces which are joined by suitable retaining means. However, for simplicity these parts are welded together at their corners to make a single unit. Cover 12 is secured to side plates 20 and bottom plate 18 by means of angle brackets 22 and bolts 24 which are secured to the front cover panel 12 and the respective contiguous side or bottom panels.

As is shown in FIGURES 2 and 3, the rectangular shaped supporting frame 26 is secured to side panels 20 and top panel 16 by suitable means such as welding. This rectangular supporting frame 26 is positioned at an angle to the top and side panels of the viewer to support the partially transmitting reflecting element 28 such that the active surface is held in a plane 45° to the normal. The rectangular supporting frame 26 has a channel 30 about its inner periphery to support the partially transmitting reflecting element 28 at a 45° angle. The partially transmitting reflecting element 28 is rigid and is held in movement-free alignment by means of the undersurfaces of front panel 12 and the top panel 16 respectively contacting edges 32 and 34 of this partially transmitting reflecting element 28.

A transverse partition bar 36 extends across the housing beneath reflecting element 28 in spaced apart parallel relation to the top and bottom panels 16 and 18. Partition bar 36 contains circular openings 38 to mount focusing lenses 40 therein.

A pair of slots or eye apertures 42 in back panel 14 are located in directly opposed relationship to inclined partially transmitting reflecting element 28. Reflecting element 28 is therefore positioned at 45° in relation to both lenses 40 and eye apertures 42. The reticle images projected by focusing lenses 40 are reflected back by reflecting element 28 through eye apertures 42. The reticle images from reticle plate 44 are reflected by the pair of reflecting elements or mirrors 46, adjustably secured by fastening means 48 to support bars 50 which extend from side panels 20 and 22. The active surfaces of reflecting elements 46 are positioned at 45° angles with respect to the reticle planes and with respect to the principal planes of lenses 40, to reflect each reticle through its respective lens 40.

The pair of reticle patterns are the distance measuring means and act as a stereoscopic reference mark to intercept the lines of sight from an object to the observer's eyes. This reference image can be produced in several forms. In FIGURE 5, one preferred form of reticle plate 44 is illustrated in detail. Reticle plate 44 may be U-shaped with parallel arms 52 and 54 containing reticle patterns 56. These patterns are in parallel, opposed relation. To provide the U-shape, arms 52 and 54 are connected by crosspiece 58 which retains a pin 60 at the center thereof. The pin 60 extends from the surface of crosspiece 58 facing plate 14, and rides in track or groove 62 on cam plate 64. Cam plate 64 is positioned in housing 10 by rotatable securing means 66. Cam track 62 is spiral in construction and is designed in the illustrative form of the invention for a visual range from about three feet to 750 feet, the latter distance being the normal limit for stereoscopic vision. Indicia 68 to indicate the range are provided on the surface of cam 64 adjacent to the periphery thereof.

In the operation of the reticle plate 44, it is necessary to convert the rotary motion of cam plate 64 to a linear movement of the reticle plate 44. Since pin 60 rides in groove 62, the radius of the groove 62 must increase or decrease as the cam plate 64 is rotated. This is obtained by determining the advance in radius required from one end of the curve to the other as well as determining the outside diameter upon which to put the curve. This information provides the inside and outside radius. For example, if it is required that with a radius of one inch, a maximum linear movement of one-quarter inch be obtained, this will give a three-quarter inch radius as the minimum radius. Therefore, when laying out the spiral groove, at zero degrees the radius equals one inch. When the cam plate is rotated 90°, the radius is reduced one fourth of the maximum one-quarter inch movement, to obtain a radius of fifteen sixteenths of an inch ($1/4 \times 1/4 = 1/16$; 1 inch minus $1/16 = 15/16$). Successive rotations through 180°, 270° and 360° will yield radii of $7/8$, $13/16$, and $3/4$ inches respectively. By connecting these plotted points, the curve of the spiral track is obtained.

To complete the conversion of cam rotation to reticle linear movement in the illustrative form of the invention, reticle plate 44 moves linearly along guide block 70, the latter being permanently secured to partition bar 36 by spacing bar 37 at points 39. Block 70 is so constructed that the parallel arms 52 and 54 of the reticle plate 44 extend around the sides thereof, while the connecting member 58 lies between block 70 and cam plate 64 with pin 60 riding in cam track 62. Thus, on rotation of cam plate 64 in a direction to cause reticle plate 44 to move toward base plate 18, the pair of reticle patterns 56 draw closer together and the stereoscopic reticle image appears to be moving toward the observer. Rotation of the cam plate in the opposite direction has a reverse effect, and the stereoscopic reticle image appears to be moving away from the observer.

Guide block 70 is of transparent material and is provided with a collecting lens 72 which is secured to its flat surface 74 by a suitable lens glue. The side opposite the lens 72 has a deep recess 76 intermediate thereof. This recess forms two plate surfaces 78 which are at a 45° angle to the flat surface 74 of the guide block 70. Each of these surfaces 78 is coated with a highly reflective coating 80 to reflect the light from collecting lens 72 through the arms 52 and 54 of reticle plate 44 to reflecting elements 46. To insure against undue scatter of light, all surfaces not necessary for reflection or transmission of light are coated a dull, flat black.

In operation the device is held up to the eyes of the observer so that he may look through eye apertures 42. Ambient light is collected by lens 72 and directed to guide block 70 to illuminate reticle patterns 56. The images of the illuminated reticle patterns are reflected by reflecting elements 46 to focusing lenses 40. These lenses permit focusing at any distance within the stereoscopic range and they image the pair of reticles at infinity. The adjustability of the parallactic separation of the images of reticle patterns 56 provides the distance measuring means. The images of the reticle patterns 56, projected by lenses 40 are reflected by the partially transmitting reflecting element 28 through eye apertures 42 to the observer's eyes.

Since reflecting element 28 also transmits light, and since lenses 40 focus the reticle image at infinity, the observer may see various objects or targets through reflecting element 28 simultaneously with the reflection of the reticle images. When a specific object is to be ranged, the knurled edge of cam plate 64 is rotated at the point where it is exposed in slot 67 until the stereoscopic reticle derived from the images of reticle patterns 56 appears to hover over the selected target or image. The distance or range can now be read directly on the cam plate 64 which is calibrated so that the sighted distance will be visible on the portion of the cam plate that is visible through slot 67 and opposite index 69 on panel 14.

The U-shaped reticle plate 44 is provided with dual reticle slots 56, but, due to the observer's stereoscopic vision, these two reticle images fuse, and he sees a single pattern floating in space. Rotation of cam plate 64 causes reticle plate 44 to move linearly and thereby causes the reflected images of the reticle patterns to appear to the observer to move toward or away from him. When both the reticle pattern and object appear to be in the same plane, the range is determined and is read directly on ranging cam 64 which has been suitably calibrated at 68.

Obviously many modifications and variations of the present invention are possible in the light of the above teachings. It is therefore to be understood that within the scope of the appended claims the invention may be practiced otherwise than as specifically described.

What is claimed is:

1. A ranging device comprising, a housing, a transmitting mirror mounted in said housing, reflecting elements secured in said housing in spaced apart relation to said transmitting mirror, focusing lenses mounted between said transmitting mirror and said reflecting elements and adapted to focus an image reflected from the reflecting elements to the mirror, a cam plate having a spiral track, rotatably secured in said housing, reticle plates movably secured in said housing and having pin means riding in the track of said cam plate, whereby rotative movement of said cam plate causes said reticle plates to move linearly, means for illuminating said reticle plates and transmitting the images on said reticle plates to said reflecting elements for focusing upon said transmitting mirror, and indicia on said cam plate, said illuminating means comprising ambient lights, a lens for collecting said ambient light secured to a guide block mounted in said housing and adapted to transmit and reflect said light to said reticle plates.

2. The combination of claim 1 wherein said reticle plates comprise a U-shaped member, the opposed arms of which contain the reticles, and a crosspiece connecting the arms, said crosspiece retaining the cam pin on the back surface thereof, said cam pin riding in said track, whereby said U-shaped reticle is adapted to move linearly along said guide block as the cam disc is rotated.

References Cited in the file of this patent

UNITED STATES PATENTS

| 911,001 | Folmer | Jan. 26, 1909 |
| 2,397,273 | Land | Mar. 26, 1946 |
| 2,431,666 | Fassin | Nov. 25, 1947 |
| 2,954,720 | Domeshek | Oct. 4, 1960 |

FOREIGN PATENTS

| 739,149 | Great Britain | Oct. 26, 1955 |